United States Patent [19]
Ronning et al.

[11] Patent Number: 5,623,175
[45] Date of Patent: Apr. 22, 1997

[54] THERMALLY EFFICIENT, LIQUID COOLED HOUSING FOR DYNAMOELECTRIC MACHINE

[75] Inventors: Jeffrey J. Ronning, Fishers; Michael D. Obermeyer, Middletown, both of Ind.

[73] Assignee: General Motors Corporation, Detroit, Mich.

[21] Appl. No.: 618,102

[22] Filed: Mar. 19, 1996

[51] Int. Cl.$^6$ ..................................... H02K 5/24
[52] U.S. Cl. ........................... 310/54; 310/58; 123/41.31
[58] Field of Search ................................. 310/16, 52, 54, 310/64, 89, 58, 91

[56] References Cited

U.S. PATENT DOCUMENTS

| | | | |
|---|---|---|---|
| 4,818,906 | 4/1989 | Kitamura et al. | 310/58 |
| 4,900,965 | 2/1990 | Fisher | 310/216 |
| 4,922,148 | 5/1990 | Kitamura | 310/68 D |
| 5,019,737 | 5/1991 | Bruno | 310/89 |
| 5,220,233 | 6/1993 | Birch et al. | 310/156 |
| 5,331,238 | 7/1994 | Johnsen | 310/58 |
| 5,448,118 | 9/1995 | Nakamura et al. | 310/54 |

Primary Examiner—Steven L. Stephan
Assistant Examiner—Timothy A. J. Williams
Attorney, Agent, or Firm—Robert M. Sigler

[57] ABSTRACT

An annular, cast housing for a dynamoelectric machine defines a single internal, circumferential, liquid coolant circulation passage having a main portion of flat, rectangular cross-section having a width extending axially across the housing and a length extending circumferentially around a majority of the housing and, at opposite ends of the main portion, transitional portions narrowing in width from opposite axial sides so that the transitional portions pass each other on the narrowing sides and smoothly convert from the flat, rectangular cross-section to a circular cross-section. The transitional portions end in conduits substantially aligned with each other and oriented in substantially opposite directions. The housing provides an array of cast, continuous, radial pillars connecting inner and outer annular walls so as to improve the efficiency of heat transfer from the walls to the liquid coolant by (1) increasing the conduction of heat from the inner annular wall to the outer annular wall, where heat transfer to the liquid coolant is more efficient due to higher liquid coolant velocity in circumferential circulation, (2) providing increased surface area for heat transfer to the liquid coolant, and (3) obstructing straight-through fluid flow paths to perturb fluid thermal boundary layers.

4 Claims, 2 Drawing Sheets

5,623,175

THERMALLY EFFICIENT, LIQUID COOLED HOUSING FOR DYNAMOELECTRIC MACHINE

BACKGROUND OF THE INVENTION

The technical field of this invention is dynamoelectric machines with housings that include liquid cooling passages. Some dynamoelectric machines, such as traction motors for electric vehicles and high capacity generators for hybrid vehicles, generate high heat in a small package; and the thermal efficiency of heat removal is an important part of their design. Liquid coolant flowing through internal passages in the housing provides an efficient method of removing heat from the machine.

For an electric or hybrid vehicle motor or generator application, an additional goal of the design is a low pressure drop in the liquid coolant circulation system, since the coolant circulating pump is a power drain in vehicle operation and the circulating pressure drop can thus have a significant effect on vehicle range. One way of decreasing the circulating pressure drop is the use of a "single loop" design, where a single coolant passage, extending in axial width across a substantial portion of the stator, conducts liquid coolant circumferentially once around the outside of the stator. The shorter coolant passage, as opposed to a coiled passage of many turns, results in a lower pressure drop, especially if it is somewhat larger in cross-sectional area; but it also may result in a decrease in heat transfer efficiency in the coolant passage, due to the more limited contact of the coolant with the housing and a decrease in velocity for the same volume liquid flow rate in a larger volume passage. In addition, unless a smooth transition is made between the inlet and outlet of the single coolant passage to the liquid coolant supply conduits, substantial pressure drops may occur at the inlet and outlet.

SUMMARY OF THE INVENTION

It is an object of this invention to provide a dynamoelectric machine housing with a liquid coolant flow passage having a low pressure drop and thermally efficient heat transfer from the passage walls to the liquid coolant.

In accordance with this object, an annular, cast housing for a dynamoelectric machine defines a single internal, circumferential, liquid coolant circulation passage having a main portion of flat, rectangular cross-section having a width extending axially across the housing and a length extending circumferentially around a majority of the housing and, at opposite ends of the main portion, transitional portions narrowing in width from opposite axial sides so that the transitional portions pass each other on the narrowing sides and smoothly convert from the flat, rectangular cross-section to a circular cross-section. The transitional portions end in conduits substantially aligned with each other and oriented in substantially opposite directions. The housing provides an array of radial pillars connecting inner and outer annular walls so as to improve the efficiency of heat transfer from the walls to the liquid coolant by (1) increasing the conduction of heat from the inner annular wall to the outer annular wall, where heat transfer to the liquid coolant is more efficient due to higher liquid coolant velocity in circumferential circulation, (2) providing increased surface area for heat transfer to the liquid coolant, and (3) obstructing straight-through fluid flow paths to perturb fluid thermal boundary layers.

DESCRIPTION OF A PREFERRED EMBODIMENT

Figure 1:
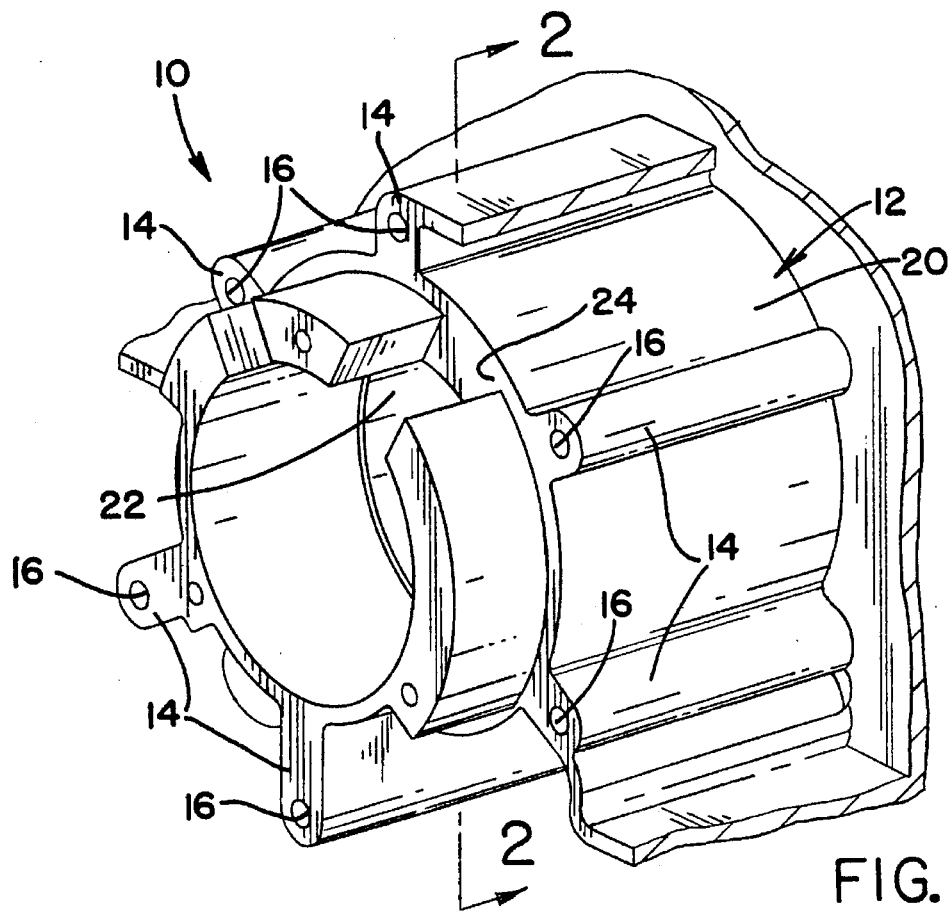
FIG. 1 is a perspective view of a dynamoelectric machine housing according to this invention.

Referring to FIG. 1, a dynamoelectric machine 10, with stator and rotor removed, comprises an annular housing member 12, preferably made of aluminum. Housing member 12 is preferably cast as a single piece in a lost foam casting process. Axial ribs 14 are provided with openings 16 for the mounting of dynamoelectric machine 10 on an engine or other body by bolts, not shown.

Figure 2:
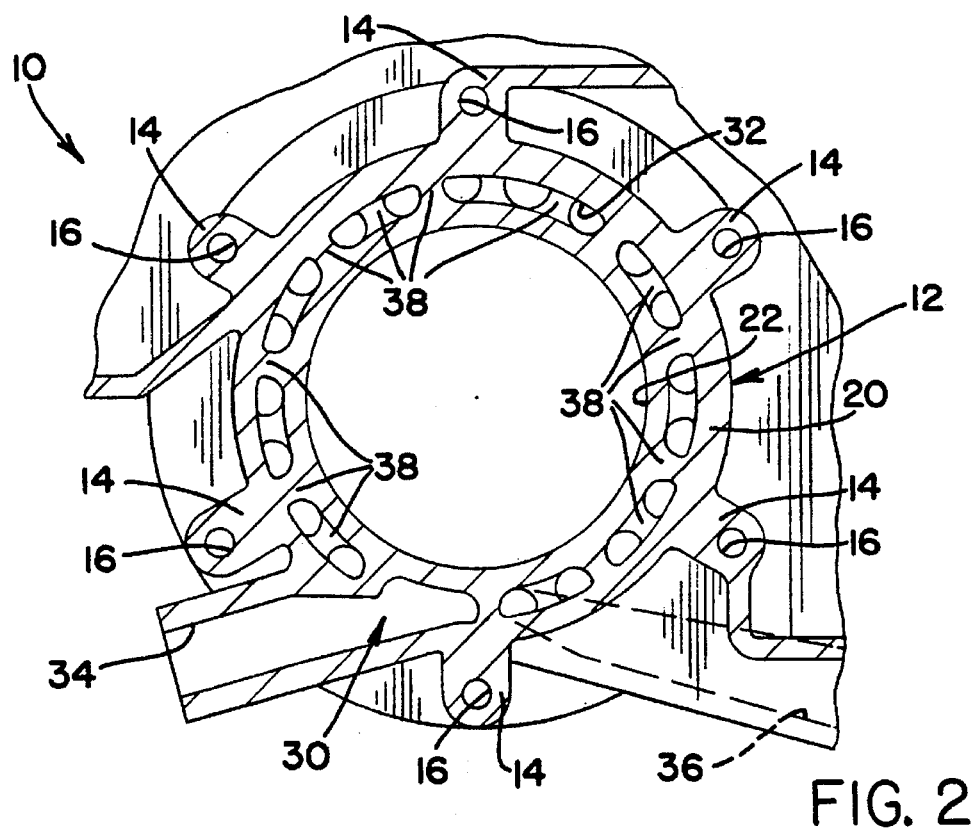
FIG. 2 is an axial, cross-section view, along lines 2—2 in FIG. 1.
Figure 3:
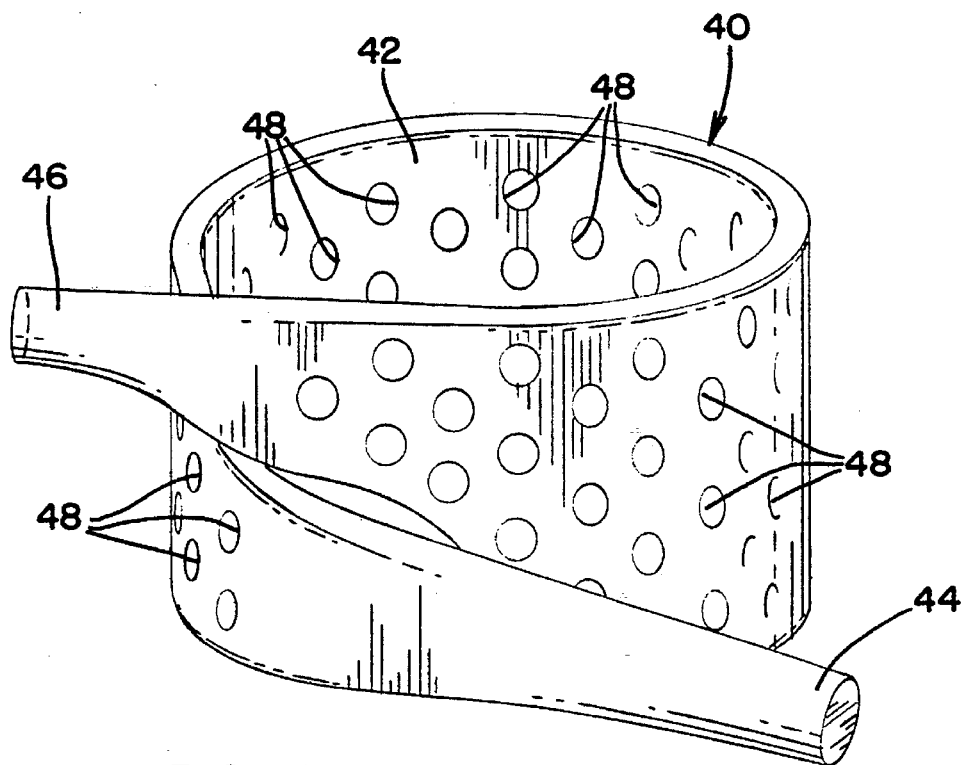
FIG. 3 is a view of a body of liquid coolant within the housing of FIG. 1, with the housing removed, so that the shape of the coolant circulation passage itself is more easily seen.

Referring to FIG. 2, housing member 12 comprises an annular outer wall 20 and an annular inner wall 22, along with a side wall 24 and a similar opposing side wall, not shown, which define therebetween the main portion 32 of an annular liquid coolant circulation passage 30. Portion 32 connects at one end to a portion of housing 12 defining an outlet portion 34 of passage 30 and at the other end to a portion of housing 12 defining an inlet portion 36 of passage 30, the latter being shown in dashed lines in FIG. 2 since it is out of the plane of the section. In order to indicate the precise shape of liquid coolant circulating passage 30, FIG. 3 shows a body of liquid 40 filling the passage, with housing 12 itself removed. The point of view of liquid 40 in FIG. 3 is substantially in the upward direction from underneath housing 12 in FIGS. 1 and 2. The outer surface of liquid 40 of FIG. 3 thus corresponds to the inner surface of liquid coolant circulating passage 30 in FIG. 2. Liquid 40 comprises a main portion 42, which is the liquid contained within main portion 32 of passage 30. Main portion 42 of liquid 40, and thus main portion 32 of passage 30, is radially short and axially wide and extends in an annular ring substantially once completely around the motor stator. Typical dimensions might be about 40 mm in axial width and 6 mm in radial height for an internal housing 12 diameter of about 81 mm. Inner annular wall 22 may be about 6 mm in radial height; outer annular wall 20 may be about 7.5 mm in radial height, not including ribs 14; and each of walls 20 and 22 may be about 102 mm in axial width. An outlet portion 44 at one end of main portion 42 and an inlet portion 46 at the other end of main portion 42 show the liquid confined within inlet and outlet portions 34 and 36, respectively, of passage 30. A typical diameter for the inlet and outlet is about 12.7 mm (½ inch).

Figure 4:
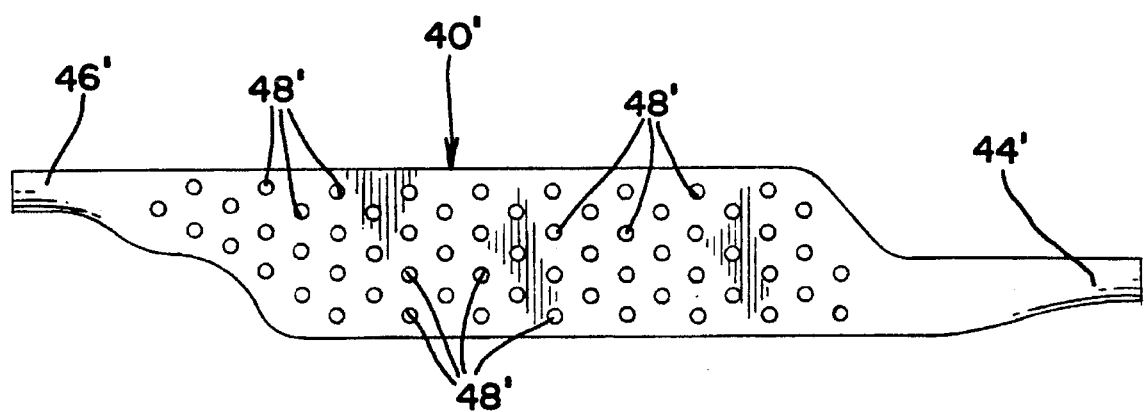
FIG. 4 shows the body of liquid coolant of FIG. 3 uncoiled for a better view of the array pattern of heat conducting pillars.

FIG. 4 shows the body of liquid 40 uncoiled into the straightened body of liquid 40', in which parts corresponding to parts of FIG. 3 have similar but primed reference numerals. FIG. 4 shows most clearly, through the shape of the confined body of liquid 40', how passage 30 narrows axially from opposite axial sides in each of portions 34 and 36. In addition, each of portions 34 and 36 smoothly changes from the flat rectangle in cross-section of portion 30 to the round conduit of the inlet and outlet. FIGS. 3 and 4 show the straight-in-and-out flow orientation at the ends produced by passage 30, which helps reduce the pressure drop. The narrowing of each end of passage 30 from opposite axial sides allows the circumferential ends to pass each other and produce the straight-in-and-out flow orientation while covering most of the outer surface of the motor stator in a single loop.

FIGS. 3 and 4 also show an array of radial circular openings 48 through liquid 40 which are created by cylindrical pillars 38 of housing 12, some of which pillars are shown in FIG. 2, with those in the plane of the section of FIG. 2 shown in section and others not in the plane of the section shown in relief. Pillars 38 extend radially through passage 30, between outer wall 20 and inner wall 22 of housing 12. These pillars are critical to the unique benefits of housing 12, since they increase thermal efficiency lost due to the shortened length of liquid coolant circulating passage 30. The pillars are typically about 6 mm in diameter and are preferably an integral part of the cast housing 12. The integral pillars thus provide a solid, continuous heat transfer path from inner wall 22 to outer wall 20. Pillars 38 greatly increase the area of heat transfer from housing 12 to the liquid coolant, mainly by efficiently conducting heat to outer wall 20. The circumferentially flowing liquid coolant moves faster at the larger diameter of outer wall 20 than at the inner wall 22; and faster flowing fluid removes heat from a wall more efficiently. In addition, pillars 38 add some additional net surface area of their own; and this surface area is also a more efficient heat transfer area, since the liquid tends to speed up locally as it flows around the pillars. Thus, the solid, cast pillars and the circumferential flow path of liquid coolant produce a greater heat transfer efficiency than would be obtained using stamped metal parts with an axial liquid coolant flow path.

The pillars will also have an effect on the pressure drop in passage 30. In accord with the desire for minimization of pressure drop, passage 30 is designed for a smooth change in flow area in portions 34 and 36 to a larger flow area in main portion 32. For example, the flow area at the inlet and outlet is about 127 sq. mm; but main portion 32 has a general cross-sectional area of about 420 sq. min. Thus, the velocity of liquid flow through passage 30 is significantly reduced; and pressure drop varies strongly with liquid velocity through the passage. The presence of pillars 38 reduces the flow area through the main portion 32 of passage 30; for example, a row of four pillars subtracts about 140 sq. mm to provide a flow area of about 280 sq. min. In addition, the rows of pillars provide an alternating flow area, which will introduce some expansion and contraction losses. However, the pressure drop will still be significantly reduced, due to the shortening of the passage and the net reduction in mean liquid velocity therein. Any pressure drop introduced by pillars 38 is more than compensated by the role of the pillars in carrying the heat of housing 12 to the surfaces, such as outer wall 20 and the pillars themselves, where liquid velocity is locally increased and heat transfer is thus more efficient.

Another benefit of the pillars 38 is their tendency to produce a turbulent or mixing effect in the liquid. This tendency is enhanced by the pattern of the array, in which alternate rows of pillars 38 are laterally offset to prevent the existence of straight-through, undisturbed liquid flow paths. This pattern is most easily seen in FIG. 4. Pillars 38 are about 6 mm in diameter and are spaced, within an axial row of four, with centers 17 mm apart from each other and the centers of the end pillars 9.4 mm from the side walls. Pillars in rows of three are the same distance apart from each other and from pillars in the alternate rows. The rows are spaced from each other by about 17 degrees of rotation around housing 12. The result is a great reduction or elimination of straight-through, undisturbed liquid flow paths and a consequent turbulent or mixing effect, with liquid flowing through passage 30 being forced out of laminar flow patterns, thermal layering being perturbed, and cooler liquid more often brought into contact with surfaces for heat transfer. It is also apparent from FIG. 4 that, since liquid enters one end of passage 30 on one axial side and exits on the other axial side, there will be a small axial component of liquid movement as it passes through passage 30. This may further enhance the mixing effect described above.

We claim:

1. An annular, cast housing for a dynamoelectric machine, the housing defining a single internal, circumferential, liquid coolant circulation passage between inner and outer annular walls, the inner annular wall receiving heat from the dynamoelectric machine, the liquid circulation passage comprising a main portion of flat, rectangular cross-section having a width extending axially across the housing and a length extending circumferentially around a majority of the housing and, at opposite ends of the main portion, transitional portions narrowing in width from opposite axial sides to an inlet and an outlet, respectively, so that the transitional portions pass each other on the narrowing sides and smoothly convert from the flat, rectangular cross-section to a circular cross-section at the inlet and outlet, the transitional portions ending in conduits substantially aligned with each other and oriented in substantially opposite directions, the housing providing, through at least the main portion of the liquid circulation passage, an array of radial pillars connecting the inner and outer annular walls so as to improve the efficiency of heat transfer from the walls to the liquid coolant by (1) increasing the conduction of heat from the inner annular wall to the outer annular wall, where heat transfer to the liquid coolant is more efficient due to higher liquid coolant velocity in circumferential circulation, (2) providing increased surface area for heat transfer to the liquid coolant, and (3) obstructing straight-through fluid flow paths to perturb fluid thermal boundary layers.

2. The housing of claim 1 wherein the pillars are cast integrally with the inner and outer annular walls.

3. The housing of claim 1 wherein the pillars are arranged in axial rows and the pillars of each row are offset axially from those of neighboring rows to reduce straight-through, undisturbed liquid flow paths through the main portion of the liquid circulation passage.

4. The housing of claim 1 wherein the cross-sectional flow area of the main portion of the liquid circulation passage is greater than that of the inlet and outlet to provide slower liquid flow for a reduced pressure drop.

\* \* \* \* \*